United States Patent [19]

Hoendervoogt et al.

[11] Patent Number: 5,107,079
[45] Date of Patent: Apr. 21, 1992

[54] POSITION DIGITIZER CIRCUIT FOR A MOVEABLE INSTRUMENT

[75] Inventors: Jason J. Hoendervoogt; Brian L. Abernathy, both of Phoenix, Ariz.

[73] Assignee: Calcomp Inc., Buena Park, Calif.

[21] Appl. No.: 670,998

[22] Filed: Mar. 18, 1991

[51] Int. Cl.⁵ ............................................. G08C 21/00
[52] U.S. Cl. ...................................................... 178/19
[58] Field of Search ..................................... 178/19, 18

[56] References Cited

U.S. PATENT DOCUMENTS 4,795,858  1/1989  Yamazaki ............................. 178/19
4,990,726  2/1991  Lasley ................................... 178/19

Primary Examiner—Stafford D. Schreyer
Attorney, Agent, or Firm—Donald A. Streck; Wm. F. Porter, Jr.

[57] ABSTRACT

The invention is a digitizer circuit in a peripheral system for a computer comprising a moveable instrument and a planar grid in which an excitation signal in one of said instrument and grid generates an induced signal in the other one of said instrument and grid, and wherein the phase difference between said excitation and induced signals is indicative of the position of said instrument with respect to said grid, comprising means for summing said excitation and induced signals to produce a sum signal and means for producing an output signal whose frequency is a function of the amplitude of said sum signal.

20 Claims, 3 Drawing Sheets

POSITION DIGITIZER CIRCUIT FOR A MOVEABLE INSTRUMENT

BACKGROUND OF THE INVENTION

The invention is a digitizer circuit in a peripheral system for a computer comprising a moveable instrument and a planar grid in which an excitation signal in one of said instrument and grid generates an induced signal in the other one of said instrument and grid, and wherein the phase difference between said excitation and induced signals is indicative of the position of said instrument with respect to said grid, comprising means for summing said excitation and induced signals to produce a sum signal and means for producing an output signal whose frequency is a function of the amplitude of said sum signal.

A hand-moveable peripheral device or instrument for a computer including a stationary planar surface under the instrument transmits to the computer digital signals indicative of the instantaneous position of the moveable instrument with respect to an X-Y coordinate system of the planar surface. One example is a mouse which is moveable over a digitizing pad. The mouse has a coil or similar device while the digitizing pad has a conductive grid. In some systems, a constant excitation signal is transmitted by the moveable instrument and the computer senses the induced response in various individual conductors in the planar surface to determine the instantaneous position of the instrument. In other systems, a variable excitation signal is transmitted from the planar surface, and the computer senses the timing of an induced response in the moveable instrument.

There are various techniques for determining the instantaneous instrument position. One is to sense current ratios across the stationary surface, as in U.S. Pat. No. 4,680,429 to Murdock et al. Another technique is to sense voltage ratios across the stationary surface, as in U.S. Pat. No. 4,603,231 to Reiffel et al. Yet another technique is to sense the timing of the response to determine the instrument position, as in U.S. Pat. No. 3,904,821 to Whetstone et al. Still another technique is to vary the frequency of an excitation signal applied to individual conductors in the grid of the stationary surface in a phase lock loop which includes the sensor coil in the moveable instrument, as in U.S. Pat. No.'s 3,983,322 and 4,022,971, both to Rodgers.

The technique to which the present invention is directed is one in which the phase of the induced signal is compared with the phase of the excitation signal to determine the instantaneous position of the moveable instrument. For example, the excitation signal may be a constant frequency RF signal transmitted by the moveable instrument, which induces RF signals of different phases in different ones of the individual conductors in an X-Y conductor grid in the stationary surface. A digitizer circuit generates a digital clock signal whose frequency is proportional to the phase difference between the excitation signal and the induced signal on a selected one of the conductors. An X-Y multiplexer permits the digitizer circuit to successively process the induced signal in each one of the conductors in the grid.

Whichever one of the conductors has a phase difference at the zero-phase crossover point is the one underlying the moveable instrument. Such a determination by a microprocessor, for example, is made for all conductors lying in the X-direction of the grid as well as all conductors lying in the Y-direction, thus providing the instantaneous X-Y coordinate of the moveable instrument. This technique is disclosed in U.S. Pat. No. 4,210,775 to Rodgers et al., U.S. Pat. No. 4,455,451 to Kriz and U.S. Pat. No. 4,734,546 to Landmeier. The present invention is directed to improving the digitization circuit.

A digitization circuit which is typical of the type employed in the above-referenced patents to Rodgers et al., Kriz and Landmeier is illustrated in FIG. 1. The X-Y multiplexer circuit (not shown) couples the induced signal V(z) from a selected one of the digitizing pad grid conductors (also not shown) to the input of a first amplifying stage 10. The output of the first amplifying stage 10 is filtered in a filter capacitor stage 12 and amplified in a second amplifying stage 14. A synchronous demodulator (or "analog switch") 16 alternately applies the output of the second amplifying stage 14 to one of two output conductors 18, 20 in synchronism with the excitation signal V(z)' of the moveable instrument or mouse. The conductors 18, 20 are coupled through respective resistor networks 22, 24 to respective differential inputs of an operational amplifier 26. The amplifier 26 produces an output voltage proportional to the phase difference between the excitation signal V(z)' and the induced signal V(z).

A voltage to frequency converter 28 produces a digital clock signal whose clock frequency is proportional to the output voltage of the operational amplifier 26. The voltage to frequency converter 28 has an integrator 30 comprising an amplifier 32, an input resistor 33 and a feedback integrating capacitor 34. The output of the integrator 30 is applied through a diode 36 to the A input of a one-shot multivibrator integrated circuit 38. The Q output of the multivibrator circuit 38 is connected to the integrating capacitor 34, while the Q' output provides the digital clock signal.

The voltage across the integrating capacitor 34 increases at a rate proportional to the phase difference between V(z) and V(z)'. Each time the integrating capacitor voltage ramps up to the threshold of the A input of the multivibrator circuit 38, the multivibrator 38 changes state so that the Q output resets the voltage on the integrating capacitor 34, while the Q' output transmits a clock pulse.

One problem with the digitization circuit of FIG. 1 is that the synchronous demodulator 16 is implemented in a separate integrated circuit, such as the 74HC4053 integrated circuit used in the above-referenced patent to Landmeier, for example, and is therefore a relatively expensive item. The four amplifiers, including the two in the first and second amplifier stages 10, 14, the operational amplifier 26 and the integrating amplifier 32 are implemented together in a National Semiconductor M837 integrated circuit, while the multivibrator circuit 38 is a 74HC4538 integrated circuit. Thus, there are three key integrated circuits in the digitizer circuit of FIG. 1, a relatively expensive configuration.

If it were somehow possible to eliminate the synchronous demodulator 16, one of the three integrated circuits would be eliminated, providing a significant reduction in parts count and increase in simplicity. Furthermore, if it were somehow possible to substitute a simpler device in place of the multivibrator integrated circuit 38, a further cost reduction and simplification would be achieved. However, such improvements have not seemed possible or practical in the prior art.

Accordingly, it is an object of the invention to provide a simpler digitizer circuit for use with a moveable instrument such as a mouse and a stationary surface such as a digitizer pad.

It is a further object of the invention to provide a digitizer circuit for use with a moveable instrument and digitizer pad which generates a clock signal whose frequency is proportional to the phase difference between the excitation and induced signals in the instrument/pad system without requiring a synchronous demodulator or analog switch or the like.

It is another object of the invention to provide a digitizer circuit for use with a moveable instrument and digitizer pad which generates a clock signal whose frequency is proportional to the phase difference between the excitation and induced signals in the instrument/pad system without requiring a synchronous demodulator or analog switch or the like and which employs a synchronous voltage to frequency converter.

It is a yet further object of the invention to provide a digitizer circuit for use with a moveable instrument and digitizer pad which generates a clock signal whose frequency is proportional to the phase difference between the excitation and induced signals in the instrument/pad system without requiring a synchronous demodulator or analog switch or the like and which employs a synchronous voltage to frequency converter requiring no multivibrator integrated circuit.

These and other objects and benefits of the invention will become apparent from the detailed description which follows hereinafter when taken in conjunction with the drawings which accompany it.

SUMMARY OF THE INVENTION

The invention is a digitizer circuit in a peripheral system for a computer comprising a moveable instrument and a planar grid in which an excitation signal in one of said instrument and grid generates an induced signal in the other one of said instrument and grid, and wherein the phase difference between said excitation and induced signals is indicative of the position of said instrument with respect to said grid, comprising means for summing said excitation and induced signals to produce a sum signal and means for producing an output signal whose frequency is a function of the amplitude of said sum signal. The invention in one embodiment further comprises means for generating an absolute value signal from said sum signal, said absolute value signal having a positive amplitude whose difference with respect to an offset amplitude is proportional to the phase difference between said excitation and induced signals, whereby said means for producing said output signal receives said absolute value signal. The means for producing said output signal comprises means for integrating said absolute value signal whereby to form a ramp signal, and means for resetting said ramp signal to an initial amplitude after said ramp signal reaches a threshold amplitude. The means for resetting is synchronized with a reference clock signal whereby said ramp signal is reset in synchronism with said reference clock signal, said means for resetting further comprising means for producing a pulse in synchronism with said reference clock signal each time said ramp signal reaches said threshold amplitude. The means for summing comprise means for capacitively coupling said excitation and induced signals through individual capacitors to a common node. The means for generating an absolute value signal comprise means for full wave rectifying said sum signal. The means for resetting and said means for producing a pulse are comprised in a flip flop having a signal input, a clock input and a pair of complementary outputs, said signal input being connected to receive said ramp signal, said clock input being connected to receive said reference clock signal, one of said complementary outputs comprising a reset node connected to said means for integrating, and the other one of said complementary outputs comprising an output node at which said output signal is produced. The means for rectifying said sum signal comprise an amplifier having an input connected to receive said sum signal and an output, and a full wave rectifying diode bridge having two phases, one phase of said diode bridge being connected across said amplifier input and output, said means for producing said absolute value signal further comprising a differential amplifier having two inputs connected across the other phase of said diode bridge.

DETAILED DESCRIPTION OF THE INVENTION

In accordance with the invention, the two integrated circuits implementing the synchronous demodulator 16 and the multivibrator 38 are eliminated. No replacement is made for the synchronous demodulator 16 while the multivibrator 38 is replaced by a single flip flop. Thus, in one embodiment, the invention only requires the LM837 integrated circuit implementing the four amplifiers discussed previously, resulting in a dramatic reduction in parts count.

Figure 2:
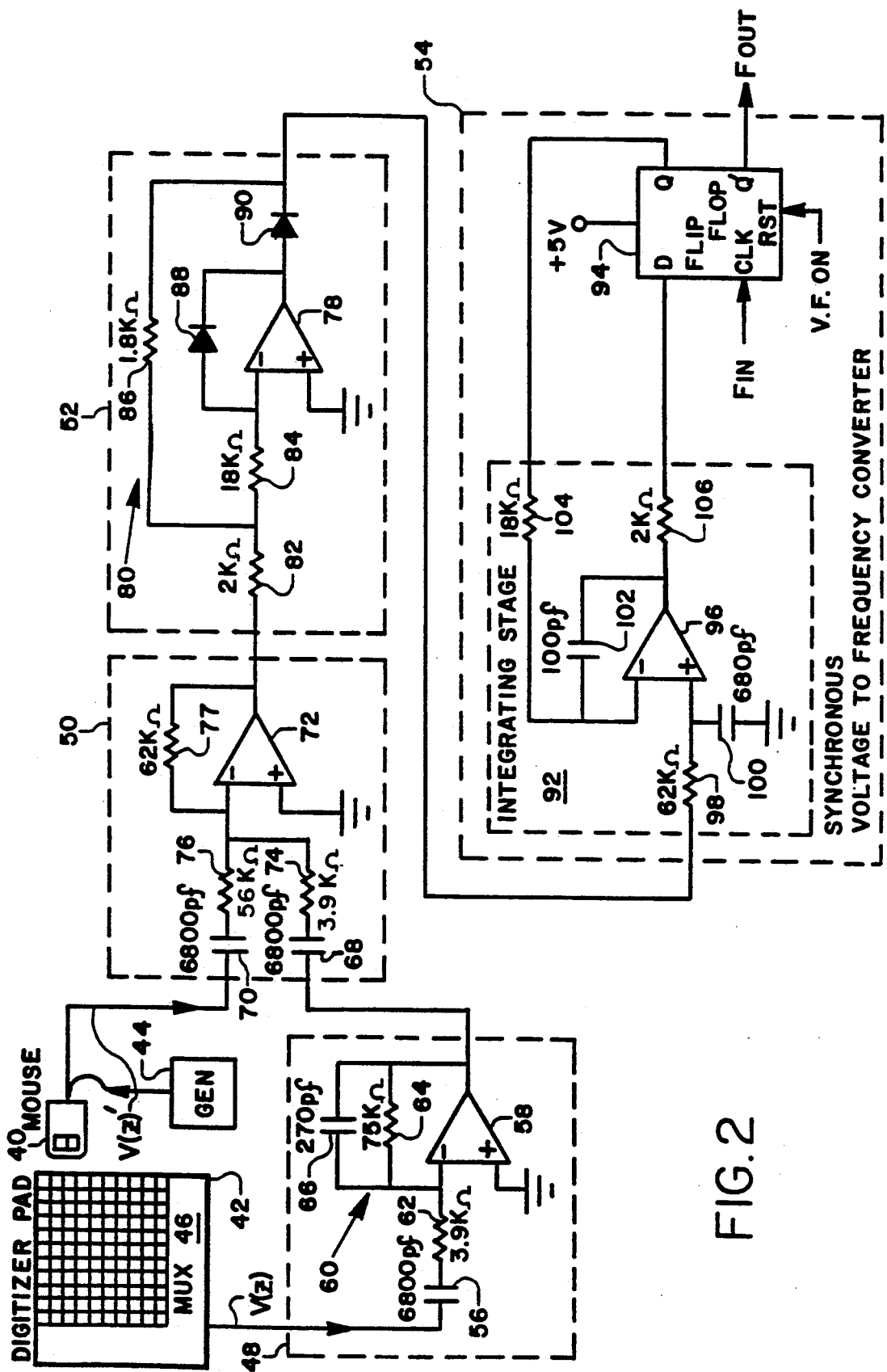
FIG. 2 is a schematic diagram of a digitizer circuit in accordance with the preferred embodiment of the invention.

Referring to the preferred embodiment illustrated in FIG. 2, a mouse 40 is moved over a digitizer pad 42. The mouse 40 has a coil (not shown) energized by a 57.6 KHz RF excitation signal $V(z)'$ from a generator 44. The digitizer pad 42 consists of a planar array or X-Y grid of conductor wires. The signal $V(z)$ induced in each wire in the grid is sequentially applied by a multiplexer 46 to the input of a bandpass amplifier stage 48. The bandpass amplifier stage 48 filters out unwanted noise and converts the range of the excitation signal $V(z)$ from 0 - 5 volts to a new range of $-2.5 - +2.5$ volts.

The output of the bandpass amplifier stage 48 is summed by a summing amplifier stage 50 with the excitation signal $V(z)'$ of the mouse 40. The sum signal produced by the summing amplifier stage 50 is then rectified by an absolute value amplifier stage 52.

The absolute value amplifier stage 52 produces a signal whose amplitude range is $0 - +2.5$ volts and which is at midrange (1.25 volts) whenever $V(z)=0$. With the amplitude of $V(z)$ approximately equal to that of $V(z)'$, the output of the absolute value amplifier stage 52 approaches 0 volts as the phase difference between $V(z)$ and $V(z)'$ approaches 180 degrees, and the output of the absolute value amplifier stage 52 approaches $+2.5$ volts as the phase difference approaches zero.

A synchronous voltage to frequency converter 54 produces a digital clock signal or pulse train $F_{OUT}$ whose frequency is proportional to the voltage of the output of the absolute value amplifier stage 52. The clock signal $F_{OUT}$ is synchronized by the voltage to frequency converter 54 with a 2.7648 MHz reference clock signal $F_{IN}$ and represents the position of the mouse 40 along one of the axes of the digitizer pad 42.

The bandpass amplifier stage 48 consists of an input capacitor 56, an operational amplifier 58 and a feedback RC network 60 connected between the output and negative input of the amplifier 58. The RC network 60 consists of an input resistor 62, a feedback resistor 64 and a feedback capacitor 6. The input capacitor 56 converts the signal V(z) induced in the digitzer pad from a 0–5 volt range to a −2.5–+2.5 volt range.

The summing amplifier stage 50 consists of a first input capacitor 68 connected to the output of the bandpass amplifier stage 48 and a second input capacitor 70 connected to receive the excitation signal V(z)' of the mouse 40. Both input capacitors 68, 70 are connected to the negative input of an operational amplifier 72 through respective resistors 74, 76. A feedback resistor 77 is connected between the output and negative input of the operational amplifier 72. The capacitor 70 converts the 0–5 volt range of the excitation signal V(z)' to a −2.5–+2.5 volt range.

The absolute value amplifier stage 52 consists of an operational amplifier 78 and a feedback resistor-rectifier network 80 connected to the output and negative input of the operational amplifier 78. The resistor-rectifier network 80 consists of input resistors 82, 84, a feedback resistor 86, a feedback diode 88 and an output diode 90.

In operation, the summing amplifier stage 50 sums the two signals V(z) and V(z)' at the negative input of the operational amplifier 72. The dependence of the voltage of the sum of these two signals with their phase difference may be thought of as constructive or non-constructive interference between two signals which are either in phase or out of phase, respectively, with one another. In the absolute value amplifier stage 52, the feedback diode 88 and the output diode 90 provide full-wave rectification of the signal produced by the summing amplifier stage 50.

The synchronous voltage to frequency converter 54 consists of an integrating amplifier stage 92 whose output is connected to the D input of a D-type flip flop 94. The clock input of the flip flop 94 receives the 2.7648 reference clock signal $F_{IN}$ and the Q' output of the flip flop 94 produces the output clock signal $F_{OUT}$.

The integrating amplifier stage 92 consists of an operational amplifier 96, an input resistor 98 connected between the output of the absolute value amplifier stage 52 and the positive input of the operational amplifier 96, a filter capacitor 100 connected between the positive input of the operational amplifier 96 and ground, an integrating capacitor 102 connected between the output and the negative input of the operational amplifier 96, a resistor 104 connected between the Q output of the flip flop 94 and the integrating capacitor 102, and an output resistor 106 connected between the output of the operational amplifier 96 and the D input of the flip flop 94.

In operation, the integrating capacitor 102 is charged by the output of the absolute value amplifier stage 52. The voltage across the integrating capacitor 102 starts from a reset or nominal voltage and reaches the threshold voltage of the D input of the flip flop 94 within a period of time whose length is determined by the voltage of the output of the absolute value amplifier stage 52, which in turn is proportional to the phase difference between V(z) and V(z)'. Each time the voltage across the integrating capacitor 102 reaches the threshold voltage of the D input of the flip flop 94, the flip flop 94 changes state upon the next positive-going edge of the reference clock signal $F_{IN}$, causing its Q output to reset the voltage on the integrating capacitor 102 and issuing a pulse on its Q' output. This latter pulse is the output clock signal $F_{OUT}$. Significantly, the voltage to frequency converter 54 employs no multivibrator circuits.

Figure 1:
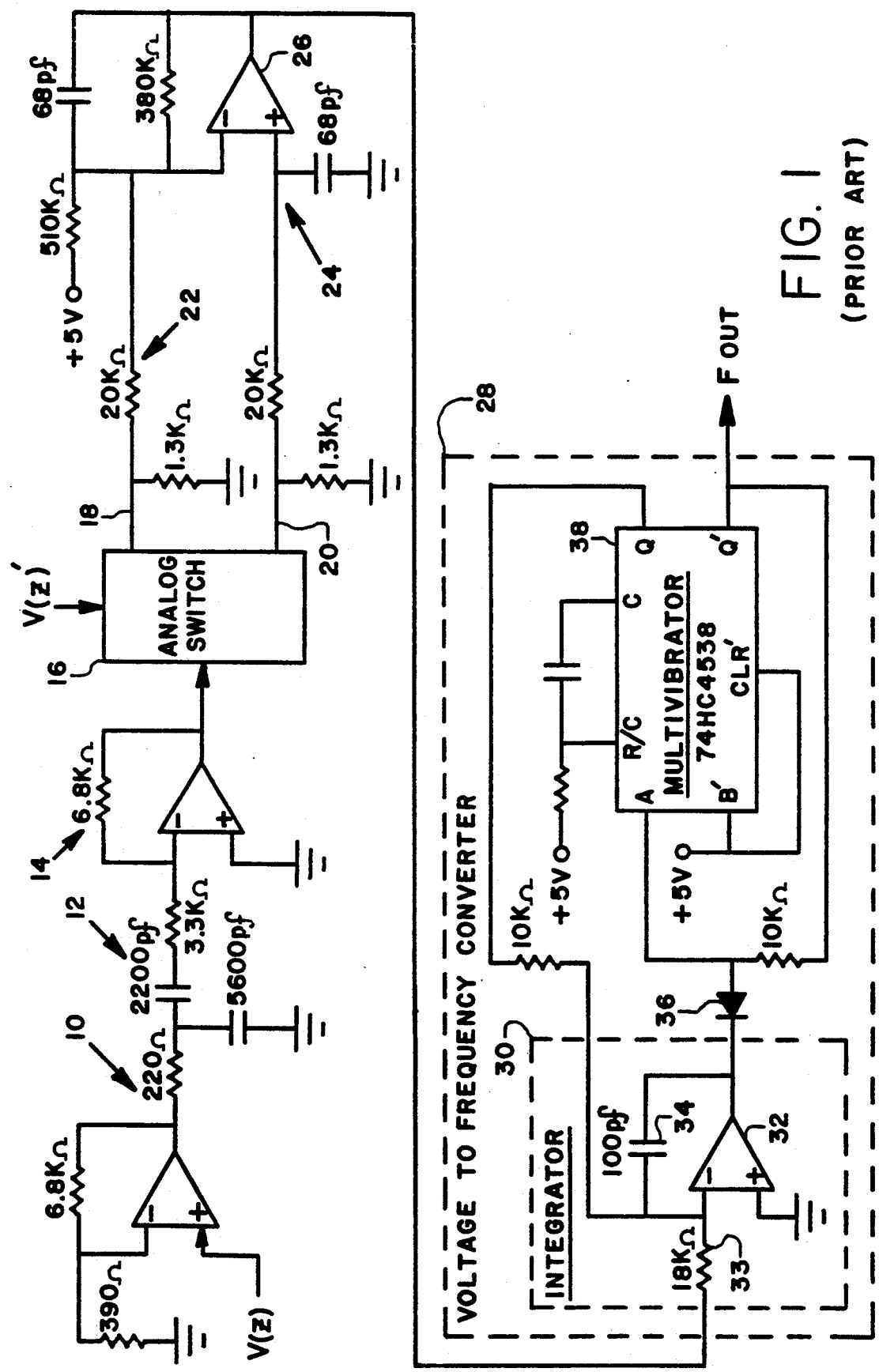
FIG. 1 is a schematic diagram of a digitizer circuit of the prior art.

The four operational amplifiers 58, 72, 78 and 96 of the digitizer circuit of FIG. 2 are implemented in the LM837 integrated circuit. Thus, the synchronous demodulator integrated circuit and the multivibrator integrated circuit required in the digitizer circuit of the prior art (FIG. 1) are both eliminated. The multivibrator integrated circuit is replaced by the single flip flop 94. As a result of all this, a dramatic reduction in part count and cost is realized in the invention.

An alternative embodiment of the invention will now be described with reference to FIG. 3. In the alternative embodiment of FIG. 3, the same reduction in part count is achieved as before with the elimination of the synchronous demodulator and the multivibrator required in the prior art.

Figure 3:
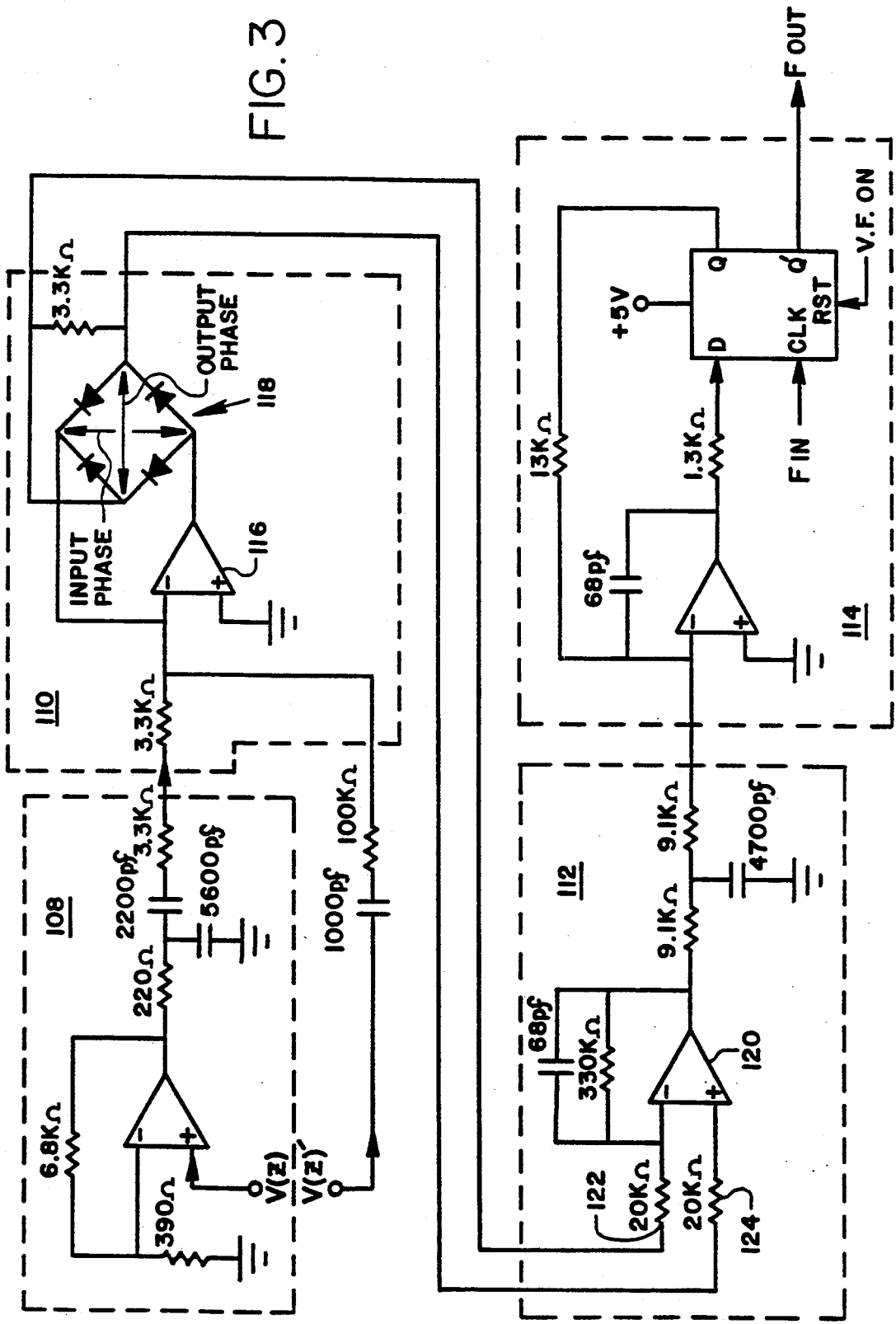
FIG. 3 is a schematic diagram of a digitizer circuit in accordance with an alternative embodiment of the invention.

In the alternative embodiment of FIG. 3, an input bandpass amplifier stage 108 having a center frequency of 67.6 KHz receives the induced signal V(z).

The induced signal V(z) from the bandpass amplifier stage 108 is summed with the excitation signal V(z)' by an absolute value and summing amplifier stage 110. The absolute value and summing amplifier stage 110 produces a signal having a positive voltage proportional to the phase difference between the induced and excitation signals V(z) and V(z)'.

A differential low pass filter amplifier stage 112 having a cut-off frequency of about 5 KHz filters the signal produced by the absolute value and summing amplifier stage 110.

The filtered signal produced by the differential bandpass amplifier stage 112 is applied to the input of a synchronous voltage to frequency converter 114. Like the voltage to frequency converter 54 of FIG. 2, the voltage to frequency converter 114 of FIG. 3 produces a digital clock signal or pulse train whose frequency is proportional to the phase difference between V(z) and V(z)'.

The bandpass amplifier stage 108 is of the type well-known to those skilled in the art and need not be described in detail herein.

The absolute value and summing amplifier stage 110 is a full wave rectifier consisting of an operational amplifier 116 having a feedback loop comprising a full wave rectifier diode bridge 118, one phase of the bridge 118 being connected between the output and negative input of the operational amplifier 110. The signals V(z) and V(z)' are summed at the negative input of the operational amplifier 116. The other phase of the bridge 118 is connected across the positive and negative inputs of an operational amplifier 120 in the differential low pass amplifier stage 112 through resistors 122 and 124.

The differential low pas amplifier stage 112 is of the type well known to those skilled in the art and need not be described in detail herein. In operation, it amplifies and filters the rectified differential voltage across the output phase of the diode bridge 118 and passes frequencies below 5 KHz.

The synchronous voltage to frequency converter 114 of FIG. 3 is of the same type as the voltage to frequency converter 54 of FIG. 2, except that the input signal is received at the negative rather than the positive input of its operational amplifier 122. The skilled circuit designer will recognize that the operational amplifiers depicted in FIG. 3 must be biased with both positive and negative voltages (e.g., +5 volts and −5 volts). In contrast, the operational amplifiers depicted in FIG. 2 require only a positive bias voltage (e.g., +5 volts).

In those systems in which the generator 44 is a square wave generator, the coil inside the mouse acts as part of a tank circuit which converts the square wave from the generator 44 to a sine wave. In this case, it is preferred that V(z)' is the sine wave, not the square wave, for best results.

While the invention has been described with reference to specific signal frequencies, integrated circuit part numbers and component values indicated in the drawings, it should be understood that any other suitable frequencies, circuit parts or components values may be used in the invention.

Wherefore, having thus described the invention, what is claimed is:

1. In a peripheral system for a computer comprising a moveable instrument and a planar grid in which an excitation signal in one of said instrument and grid generates an induced signal in the other one of said instrument and grid, and wherein the phase difference between said excitation and induced signals is indicative of the position of said instrument with respect to said grid, a digitizer circuit comprising:
   means for summing said excitation and induced signals to produce a sum signal;
   means for producing an output signal whose frequency is a function of the amplitude of said sum signal.

2. The digitizer circuit of claim 1 further comprising means for generating an absolute value signal from said sum signal, said absolute value signal having a positive amplitude whose difference with respect to an offset amplitude is proportional to the phase difference between said excitation and induced signals, whereby said means for producing said output signal receives said absolute value signal.

3. The digitizer circuit of claim 2 wherein said means for producing said output signal comprises:
   means for integrating said absolute value signal whereby to form a ramp signal;
   means for resetting said ramp signal to an initial amplitude after said ramp signal reaches a threshold amplitude.

4. The digitizer circuit of claim 3 wherein:
   said means for resetting is synchronized with a reference clock signal whereby said ramp signal is reset in synchronism with said reference clock signal,
   said means for resetting further comprising means for producing a pulse in synchronism with said reference clock signal each time said ramp signal reaches said threshold amplitude.

5. The digitizer circuit of claim 1 wherein said means for summing comprise means for capacitively coupling said excitation and induced signals through individual capacitors to a common node.

6. The digitizer circuit of claim 2 wherein said means for generating an absolute value signal comprise means for full wave rectifying said sum signal.

7. The digitizer circuit of claim 4 wherein:
said means for resetting and said means for producing a pulse are comprised in a flip flop having a signal input, a clock input and a pair of complementary outputs,
said signal input being connected to receive said ramp signal,
said clock input being connected to receive said reference clock signal,
one of said complementary outputs comprising a reset node connected to said means for integrating, and
the other one of said complementary outputs comprising an output node at which said output signal is produced.

8. The digitizer circuit of claim 6 wherein:
said means for rectifying said sum signal comprise:
an amplifier having an input connected to receive said sum signal and an output, and
a full wave rectifying diode bridge having two phases, one phase of said diode bridge being connected across said amplifier input and output;
said means for producing said absolute value signal further comprising:
a differential amplifier having two inputs connected across the other phase of said diode bridge.

9. The digitizer circuit of claim 3 wherein:
said induced and excitation signals are RF voltage signals having the same RF frequency,
said circuit further comprising means for filtering said RF frequency whereby said absolute value signal does not contain said RF frequency.

10. In a peripheral system for a computer in which the phase difference between an excitation signal and an induced signal is indicative of the position of a moveable instrument with respect to a planar surface, a digitizer circuit for producing an output signal whose frequency is a function of the phase difference between the excitation and induced signals, said digitizer circuit comprising:
phase-to-amplitude modulator means for summing said induced and excitation signals to produce a phase signal, said phase signal having an amplitude proportional to the phase difference between said induced and excitation signals;
frequency modulator means for producing an output signal whose frequency is a function of the amplitude of said phase signal.

11. The digitizer circuit of claim 10 wherein said phase-to-amplitude modulator means comprises:
means for summing said two input signals at a summing node; and
means for rectifying the sum of said two input signals to produce said sum signal.

12. The digitizer circuit of claim 10 wherein said frequency modulator means comprise a synchronous voltage to frequency converter.

13. The digitizer circuit of claim 11, wherein said phase to amplitude modulator means further comprise means for filtering out of RF frequencies present in said induced and excitation signals.

14. A method for producing an output signal whose frequency is proportional to the phase difference between an excitation signal and an induced signal, said phase difference being proportional to the distance between a moveable instrument and a selected elongate sensor in a planar grid of elongate sensors, said method comprising:
adding said excitation and induced signals at a summing node to produce a sum signal;
producing an output signal whose frequency is a function of the amplitude of said sum iignal.

15. The method of claim 14 wherein said adding step comprises:

generating an absolute value signal from the sum of said excitation and induced signals, said absolute value signal having a positive amplitude whose difference with respect to an offset amplitude is proportional to the phase difference between said excitation and induced signals.

16. The method of claim 15 wherein said step of producing said output signal comprises:

integrating said absolute value signal whereby to form a ramp signal;

resetting said ramp signal to an initial amplitude after said ramp signal reaches a threshold amplitude.

17. The method of claim 16 wherein:

said step of resetting is synchronized with a reference clock signal whereby said ramp signal is reset in synchronism with said reference clock signal, said step of resetting further comprising:

producing a pulse in synchronism with said reference clock signal each time said ramp signal reaches said threshold amplitude.

18. The method of claim 14 wherein said step of adding comprises capacitively coupling said excitation and induced signals through individual capacitors to a common node.

19. The method of claim 15 wherein said step of generating an absolute value signal comprises full wave rectifying the sum of said excitation and induced signals.

20. The method of claim 16 further comprising filtering out RF frequencies present in said excitation and induced signals, whereby said ramp signal is continuous.

* * * * *

UNITED STATES PATENT AND TRADEMARK OFFICE
CERTIFICATE OF CORRECTION

PATENT NO. : 5,107,079
DATED : April 21, 1992
INVENTOR(S) : Jason J. Hoendervoogt, et. al.

It is certified that error appears in the above-indentified patent and that said Letters Patent is hereby corrected as shown below:

On the Title page, item [75], "Briam L. Abernathy" should be -- Brian L. Abernethy--.

On the Title page, item [73], "Buena Park, Calif". should be -- Anaheim, Calif.--; and Signed and Sealed this Twenty-first Day of December, 1993

Attest:

BRUCE LEHMAN

*Attesting Officer*      *Commissioner of Patents and Trademarks*